W. J. FETTER.
Belt Pulley.

No. 232,635. Patented Sept. 28, 1880.

Attest,
Saml. V. Boyd
Charles Pickles

Inventor,
William J. Fetter,
by Chas. D. Moody,
atty.

UNITED STATES PATENT OFFICE.

WILLIAM J. FETTER, OF ST. LOUIS, MISSOURI.

BELT-PULLEY.

SPECIFICATION forming part of Letters Patent No. 232,635, dated September 28, 1880.

Application filed February 14, 1880.

*To all whom it may concern:*

Be it known that I, WILLIAM J. FETTER, of St. Louis, Missouri, have made a new and useful Improvement in Belt-Pulleys, of which the following is a full, clear, and exact description, reference being had to the annexed drawings, making part of this specification, in which—

Figure 1:
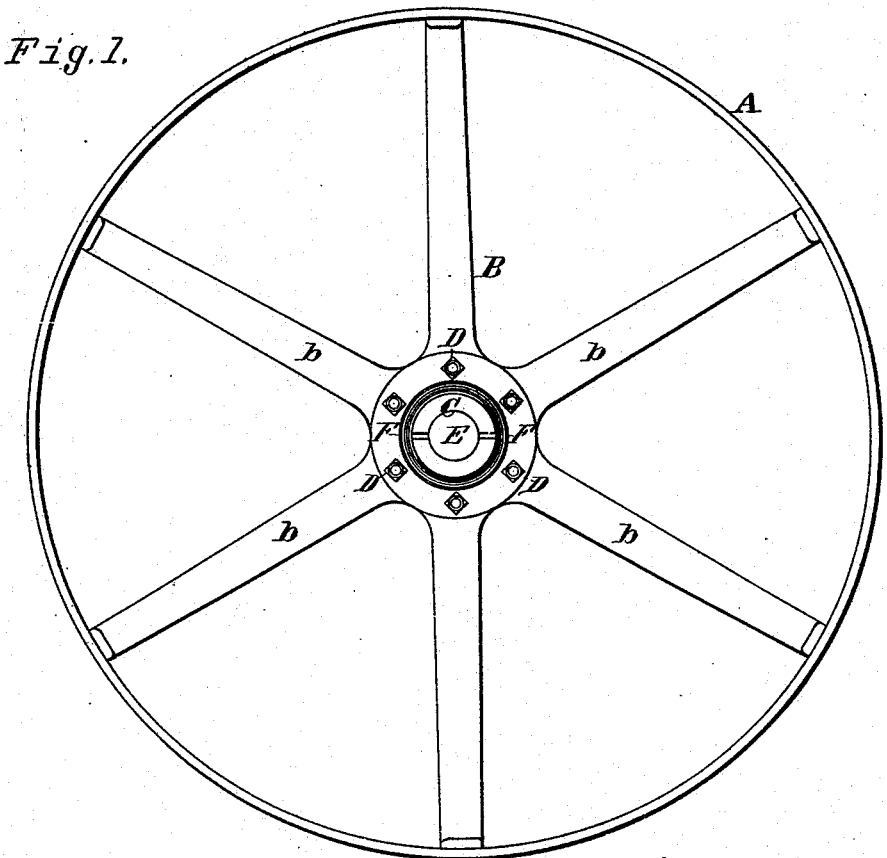
Figure 2:
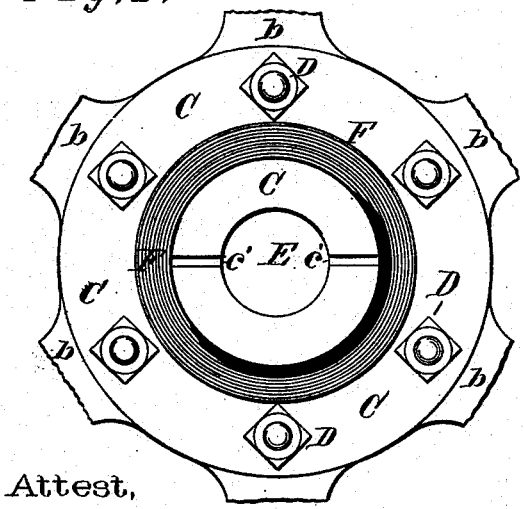
Figure 3:
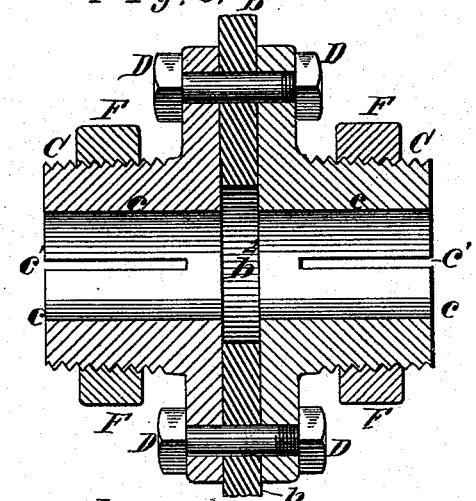

Figure 1 is a side elevation of a pulley having the improvement; Figs. 2 and 3, details upon an enlarged scale, being, respectively, a side elevation and a cross-section of the central portion of the pulley.

The same letters denote the same parts.

This invention is an improvement in that class of belt-pulleys in which the hub is detachable from the spider, which, in turn, has a central opening larger in diameter than the pulley-shaft.

The improvement consists in the peculiar construction of the central portion of the pulley, substantially as hereinafter described.

Referring to the drawings, A represents the pulley-rim of the ordinary construction.

B represents the spider, consisting of the spokes $b\ b\ b$ and the central ring, $b'$. The diameter $b^2$ of the latter is, as shown in Fig. 3, larger than the diameter or bore of the hub C C. The hub is made in two similar parts, C C, which are fastened to the spider by means of a suitable fastening, such as the bolts D D, the spider and hub being concentric.

To enable the pulley to be attached to the shaft E the tubular portions $c\ c$ of the hub are threaded and made slightly tapering, and are slotted at $c'\ c'$. Then, after the pulley is properly located upon the shaft, rings F F are screwed onto the hub, causing the slotted ends of the parts $c\ c$ to contract upon the shaft sufficiently to bind the pulley thereto.

When it is desired to change the pulley to another shaft of different diameter the rings F F are unscrewed, the hub C C detached from the spider B, and another similar hub, but of a diameter suited to the intended shaft, attached in place thereof. Thus the same spider and rim can be used upon several different shafts, the only thing requiring change being the hub.

I am aware of and disclaim the construction patented to A. Newell, February 6, 1872, Letters Patent No. 123,413.

I claim—

The combination of the spider B, having a central opening, $b^2$, of larger diameter than the shaft E, the parts C C, having the tapered, threaded, and slotted portions $c\ c$, the shaft E, the rings F F, and bolts D D, substantially as described and shown.

Witness my hand.

W. J. FETTER.

Witnesses:
CHAS. D. MOODY,
J. F. DEADY.